(12) United States Patent　　(10) Patent No.:　　US 10,780,923 B2
Caliskan et al.　　(45) Date of Patent:　　Sep. 22, 2020

(54) VEHICLE PLATFORM

(71) Applicant: Ford Global Technologies, LLC, Dearborn, MI (US)

(72) Inventors: Ari Garo Caliskan, Canton, MI (US); Arnold Kadiu, Dearborn, MI (US); Shawn Michael Morgans, Chelsea, MI (US); Parameswararao Pothuraju, Canton, MI (US); Aref Vandadi, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 123 days.

(21) Appl. No.: 16/034,742

(22) Filed: Jul. 13, 2018

(65) Prior Publication Data

US 2020/0017147 A1　Jan. 16, 2020

(51) Int. Cl.
*B60J 7/00*　　(2006.01)
*B62D 21/15*　　(2006.01)
*B62D 21/03*　　(2006.01)
*B62D 27/06*　　(2006.01)
*B62D 25/02*　　(2006.01)
*B62D 27/02*　　(2006.01)
*B60K 1/04*　　(2019.01)
*B62D 25/20*　　(2006.01)
*B60N 2/015*　　(2006.01)
*B60K 6/40*　　(2007.10)
*B60L 50/60*　　(2019.01)

(52) U.S. Cl.
CPC .............. *B62D 21/157* (2013.01); *B60K 1/04* (2013.01); *B60N 2/015* (2013.01); *B62D 21/03* (2013.01); *B62D 25/025* (2013.01); *B62D 25/2036* (2013.01); *B62D 27/02* (2013.01); *B62D 27/065* (2013.01); *B60K 6/40* (2013.01); *B60K 2001/0438* (2013.01); *B60L 50/66* (2019.02); *B60Y 2200/91* (2013.01); *B60Y 2200/92* (2013.01)

(58) Field of Classification Search
CPC ............... E01F 13/12; Y10T 292/1082; B60G 2200/314; B60T 8/26; B62D 25/025; B62D 1/28; B60P 3/08; G07B 15/063; G01S 13/931; G01C 21/28
See application file for complete search history.

(56) References Cited

U.S. PATENT DOCUMENTS

| | | | |
|---|---|---|---|
| 5,390,754 A * | 2/1995 | Masuyama | B60K 1/04 180/68.5 |
| 6,085,854 A | 7/2000 | Nishikawa | |
| 6,668,957 B2 | 12/2003 | King | |
| 6,899,194 B2 * | 5/2005 | Chernoff | B60G 17/0195 180/311 |

(Continued)

*Primary Examiner* — Kiran B Patel
(74) *Attorney, Agent, or Firm* — David Coppiellie; Bejin Bieneman PLC

(57) ABSTRACT

A vehicle includes a vehicle frame elongated along a longitudinal axis. The vehicle frame includes a first rail and a second rail spaced from each other and each elongated along the longitudinal axis. The vehicle frame includes a longitudinal beam between the first and second rails and elongated along the longitudinal axis. The vehicle includes a vehicle body. The vehicle body includes a cross-beam directly connected to the longitudinal beam and to the first and second rails.

20 Claims, 8 Drawing Sheets

(56) References Cited

U.S. PATENT DOCUMENTS

| | | | |
|---|---|---|---|
| 7,434,871 B2 * | 10/2008 | Mizuma | B60N 2/015 |
| | | | 296/193.07 |
| 7,695,040 B2 * | 4/2010 | Brennecke | B62D 29/002 |
| | | | 296/187.02 |
| 8,037,960 B2 * | 10/2011 | Kiya | B60K 1/04 |
| | | | 180/68.5 |
| 8,079,435 B2 * | 12/2011 | Takasaki | B60K 1/04 |
| | | | 180/68.5 |
| 8,556,016 B2 * | 10/2013 | Yoda | B60K 1/04 |
| | | | 180/65.31 |
| 8,561,743 B2 | 10/2013 | Iwasa et al. | |
| 8,739,907 B2 * | 6/2014 | Storc | B60K 1/04 |
| | | | 180/68.5 |
| 8,833,839 B2 * | 9/2014 | Young | B62D 21/157 |
| | | | 296/187.12 |
| 8,863,878 B2 | 10/2014 | Shirooka et al. | |
| 8,939,246 B2 * | 1/2015 | Yamaguchi | B60K 1/04 |
| | | | 180/68.5 |
| 9,027,684 B2 * | 5/2015 | Araki | B60K 1/04 |
| | | | 180/311 |
| 9,259,998 B1 * | 2/2016 | Leanza | B60K 1/04 |
| 9,321,338 B2 * | 4/2016 | Naruke | B60K 1/04 |
| 9,738,324 B1 * | 8/2017 | Vigil | B62D 25/04 |
| 9,821,645 B2 * | 11/2017 | Hayashi | B60K 1/00 |
| 9,849,768 B2 * | 12/2017 | Hayashi | B60R 16/04 |
| 9,926,017 B1 * | 3/2018 | Hamilton | B62D 27/02 |
| 9,956,861 B2 * | 5/2018 | Nomura | B60K 1/04 |
| 10,017,037 B2 * | 7/2018 | Newman | B62D 25/20 |
| 10,124,927 B2 * | 11/2018 | Bradley | B65D 88/12 |
| 10,155,542 B2 * | 12/2018 | Gao | B62D 21/157 |
| 10,183,698 B2 * | 1/2019 | Ta | B60K 1/00 |
| 10,183,700 B2 * | 1/2019 | Hata | B62D 21/157 |
| 10,232,697 B2 * | 3/2019 | Hara | B60K 1/04 |
| 10,272,949 B2 * | 4/2019 | Faruque | B60K 1/04 |
| 2012/0313399 A1 * | 12/2012 | Caliskan | B62D 25/20 |
| | | | 296/193.01 |
| 2017/0225587 A1 * | 8/2017 | Newman | B60L 50/64 |
| 2017/0305249 A1 | 10/2017 | Hara | |
| 2018/0050607 A1 * | 2/2018 | Matecki | B60K 1/04 |
| 2018/0186227 A1 * | 7/2018 | Stephens | B60L 50/66 |
| 2018/0337378 A1 * | 11/2018 | Stephens | H01M 2/1083 |
| 2018/0370573 A1 * | 12/2018 | Yang | B62D 25/025 |
| 2019/0077462 A1 * | 3/2019 | Yang | B62D 25/025 |

* cited by examiner

VEHICLE PLATFORM

BACKGROUND

A vehicle includes a vehicle frame and a vehicle body supported on the vehicle frame. The frame includes two rails elongated in a vehicle-longitudinal direction and cross-members between the two rails and extending cross-vehicle from one rail to the other rail. The cross-members connect the two rails to each other and provide cross-vehicle reinforcement to the vehicle frame. The cross-members can create packaging constraints, with other components of the vehicle packaged on top of the cross-members and/or between the cross-members.

DETAILED DESCRIPTION

Figure 1:
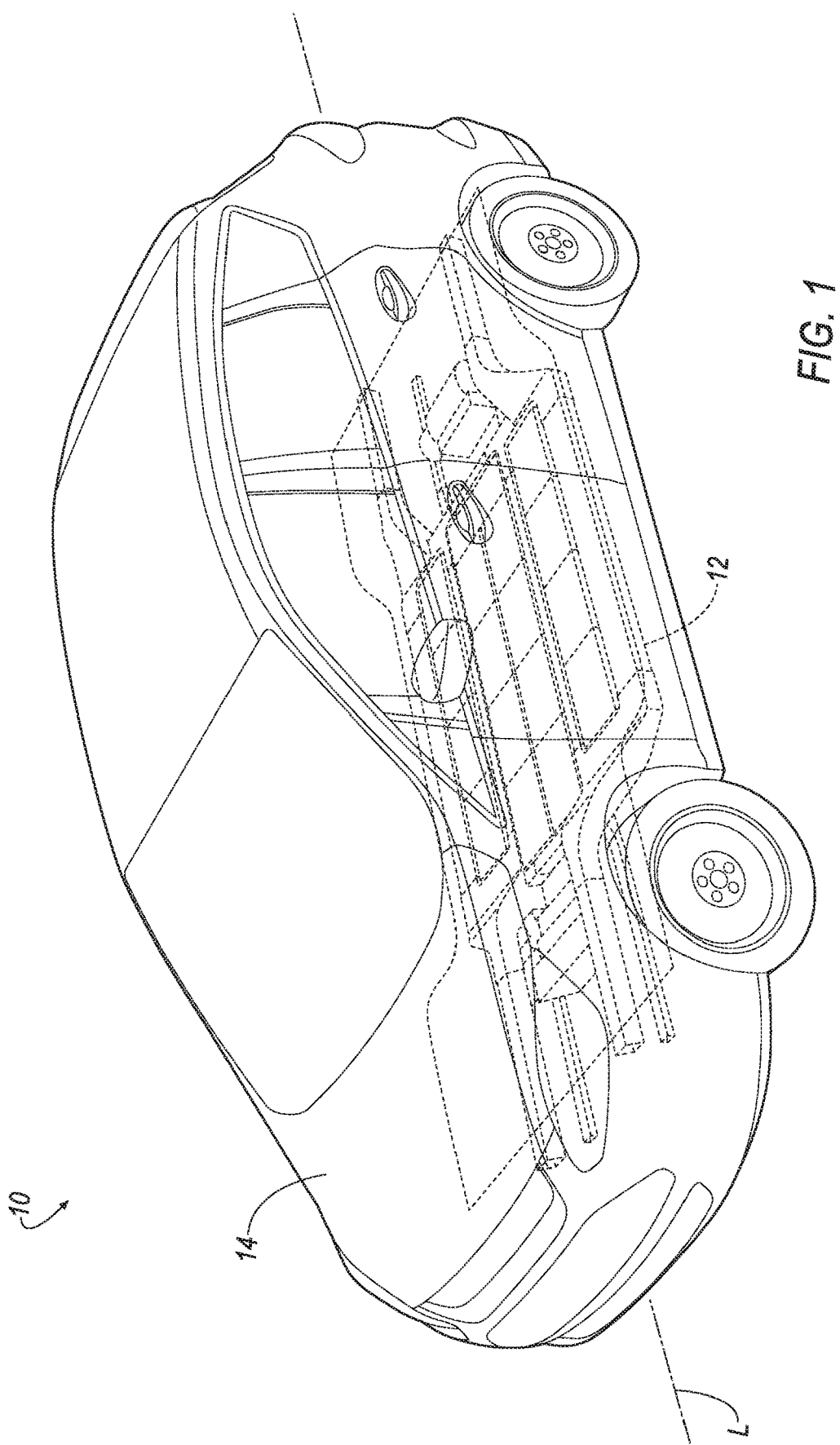
FIG. 1 is a perspective view of a vehicle including a vehicle body and a vehicle frame shown in hidden lines.

A vehicle includes a vehicle frame elongated along a longitudinal axis. The vehicle frame includes a first rail and a second rail spaced from each other and each elongated along the longitudinal axis. The vehicle frame includes a longitudinal beam between the first and second rails and elongated along the longitudinal axis.

The vehicle includes a vehicle body. The vehicle body includes a cross-beam directly connected to the longitudinal beam and to the first and second rails. The vehicle may include a fastener engaging the cross-beam and the first rail, a fastener engaging the cross-beam and the second rail, and a fastener engaging the cross-beam and the longitudinal beam.

The first and second rails and the longitudinal beam may each include a top surface, and the fasteners may extend through the top surfaces, respectively.

The vehicle body may include a first rocker and a second rocker each elongated along the longitudinal axis, and the cross-beam may be welded to the first rocker and the second rocker.

The first and second rails may each include a top surface, and the first rocker and the second rocker may be supported by the top surfaces.

The vehicle may include a floor. The fasteners may extend through the floor.

The fasteners may be threaded fasteners.

The vehicle body may include a first rocker and a second rocker each elongated along the longitudinal axis. The cross-beam may be directly connected to the first rocker and the second rocker. The cross-beam may be welded to the first rocker and the second rocker.

The vehicle may include a reinforcement disposed in the first rocker and aligned with the cross-beam along the longitudinal axis.

The first and second rails and the longitudinal beam may each include a top surface. The cross-beam may be directly connected to the top surfaces of the first and second rails and the longitudinal beam.

The vehicle body may include a first rocker and a second rocker each elongated along the longitudinal axis and directly connected to the top surfaces of the first and second rails. The cross-beam may be directly connected to the first rocker and the second rocker.

The cross-beam may be designed to transmit force from one of the first and second rails to the other of the first and second rails during a side impact.

The vehicle may include a floor supported by the longitudinal beams.

The vehicle may include batteries supported by the vehicle frame between the longitudinal beam and at least one of the first and second rail.

The cross-beam may include seat mounts.

The vehicle may include a front end and a rear end. The first and second rails may be between the front end and the rear end and may be recessed vertically relative to the front end and the rear end. The first and second rails may extended outwardly relative to the front end and the rear end in cross-vehicle directions.

The vehicle may include a panel with the first rail, the second rail, and the longitudinal beam may be disposed between the panel and the cross-beam.

The vehicle may include batteries above the panel and below the cross-beam.

With reference to the Figures, wherein like numerals indicate like parts throughout the several views, a vehicle 10 includes a vehicle frame 12 and a vehicle body 14. The vehicle frame 12 includes a first rail 16 and a second rail 18 each elongated along a longitudinal axis L. The vehicle frame 12 includes a longitudinal beam 20 between the first rail 16 and second rail 18. The vehicle body 14 includes a cross-beam 22. The cross-beam 22 of the vehicle body 14 is directly connected to the first rail 16, the second rail 18, and the longitudinal beam 20 of the vehicle frame 12.

Since the cross-beam 22 of the vehicle body 14 is directly connected to the first rail 16, the second rail 18, and the longitudinal beam 20, the cross-beam 22 increases the cross-vehicle structural rigidity of the vehicle frame 12. For example, during a side impact, e.g., a side pole impact test, the cross-beam 22 transfers forces from the rail on the impacted side to the longitudinal beam 20 and the other rail. Since the cross-beam 22 is a component of the vehicle body 14 and increases the cross-vehicle structural rigidity of the vehicle frame 12, the vehicle frame 12 may include one or more battery compartments 24, and these battery compartments 24 may be free of cross-members, as described further below.

The connection between the cross-beam 22 and the longitudinal beam 20 reinforces the structural rigidity cross-beam 22. For example, this connection increases the flexural rigidity of the cross-beam 22, i.e., increases the force at which the cross-beam 22 buckles.

The vehicle 10 may be an electric vehicle, e.g., a plug-in hybrid electric vehicle (PHEV), a hybrid electric vehicle (HEV), battery electric vehicle (BEV), etc. When electric, the vehicle 10 includes batteries 26. The batteries 26 may be of any suitable type for vehicular electrification, for example, lithium-ion batteries, nickel-metal hydride batteries, lead-acid batteries, or ultracapacitors, as used in, for example, PHEVs, HEVs, BEVs, etc.

Figure 2:
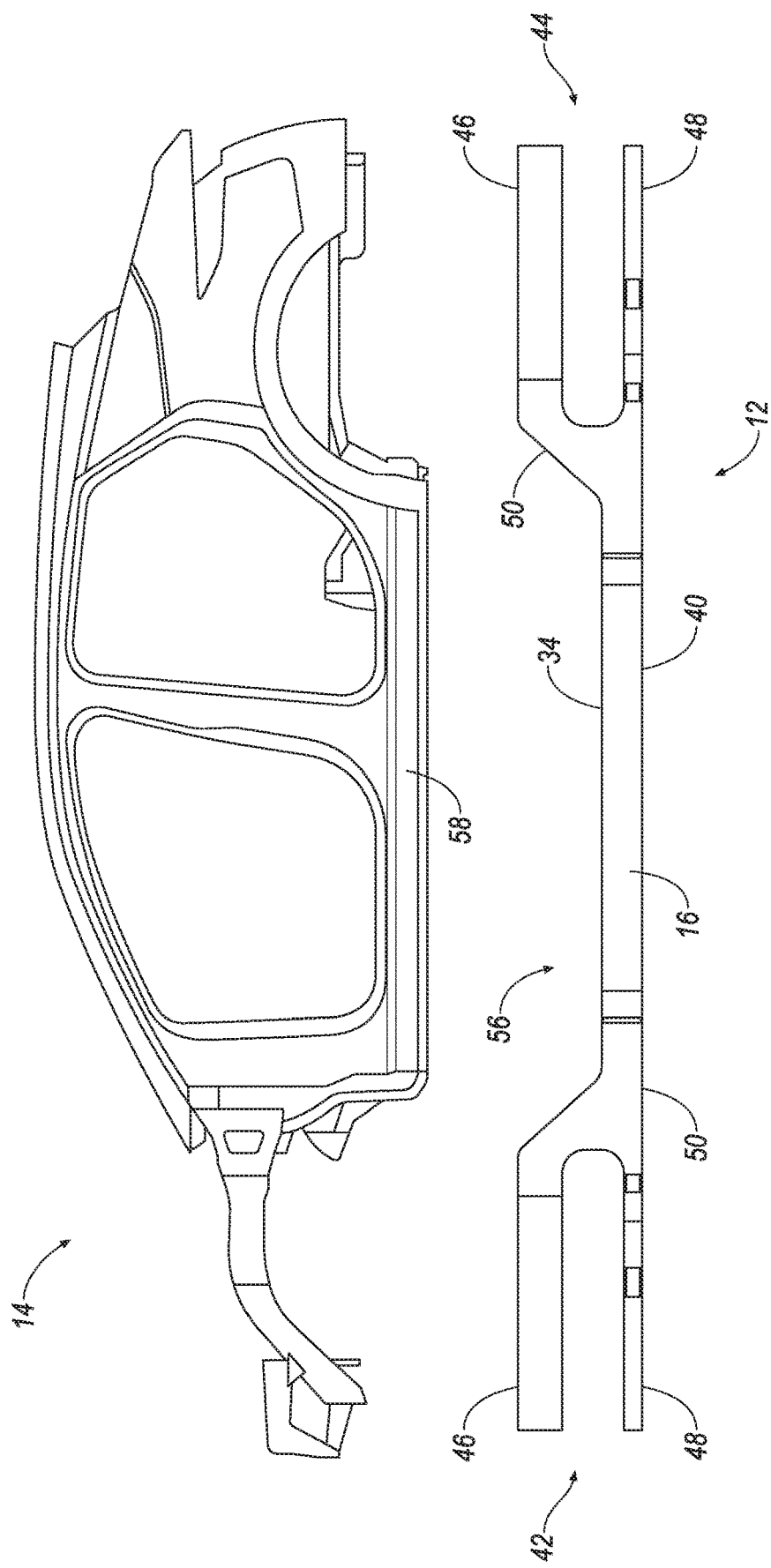
FIG. 2 is a side view of the vehicle frame and vehicle body separated from the vehicle frame.

With reference to FIGS. 1 and 2, the vehicle 10 has a body-on-frame construction (also referred to as a cab-on-frame construction). In other words, the vehicle body 14 and vehicle frame 12 are separate components, i.e., are modular, and the vehicle body 14 is supported by and affixed to the vehicle frame 12. Alternatively, the vehicle body 14 and the vehicle frame 12 may have any suitable construction. The vehicle body 14 and/or the vehicle frame 12 may be formed of any suitable material, for example, steel, aluminum, etc.

Figure 3:
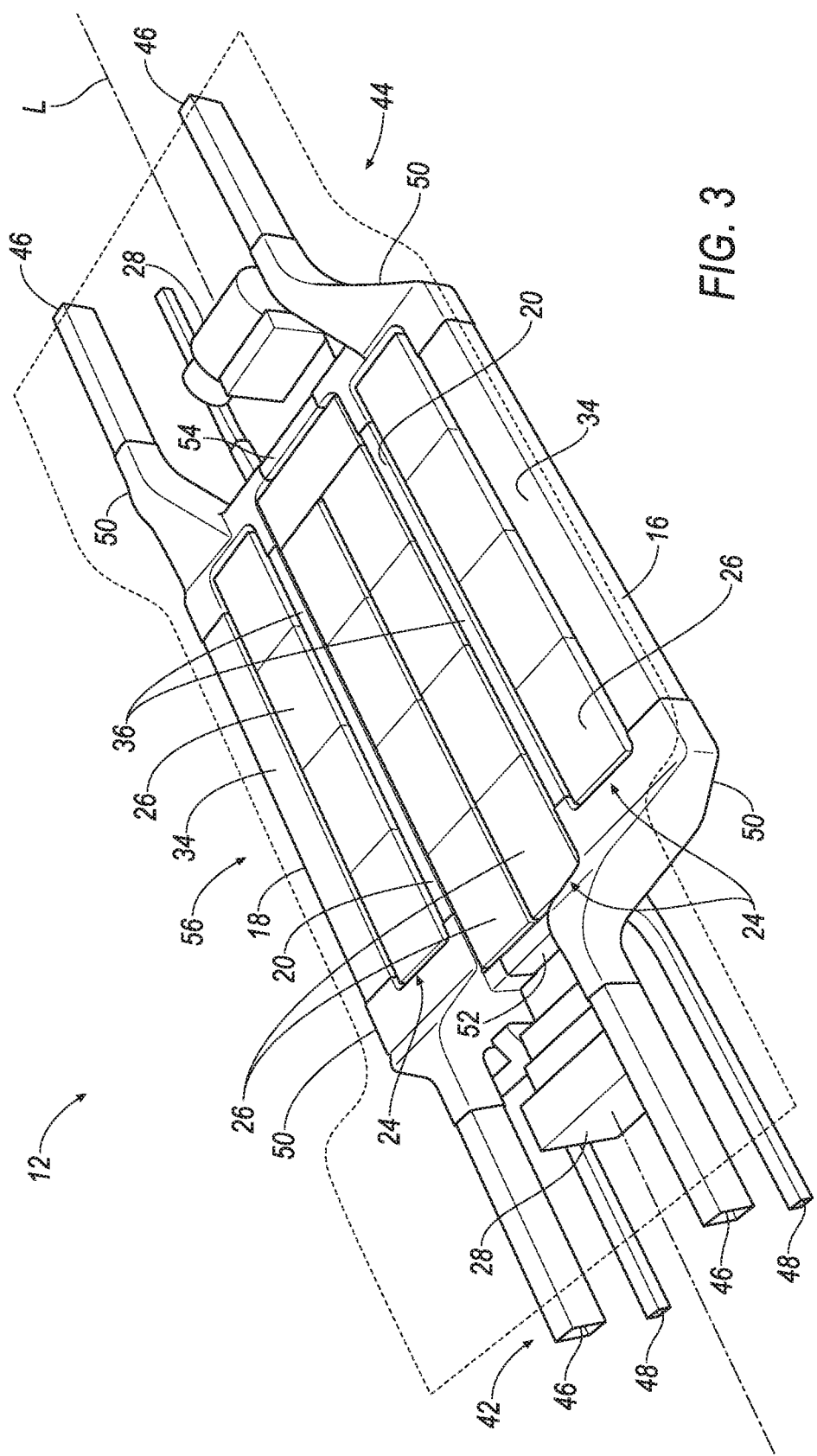
FIG. 3 is a perspective view of the vehicle frame with a first rail, a second rail, longitudinal beams, and batteries, and with a portion of the vehicle body shown in broken lines.

With reference to FIGS. 1-3, the vehicle frame 12 may bear the load of some or all other structures of the vehicle 10. For example, the vehicle frame 12 supports the vehicle body 14 and, as set forth further below, the frame 12 may support batteries 26, a motor 28, suspension, and steering equipment (not shown), etc.

The vehicle frame 12 may be elongated along the longitudinal axis L. In other words, length of the vehicle frame 12 along the longitudinal axis L may be greater than a width of the vehicle frame 12 perpendicular to the longitudinal axis L.

With reference to FIG. 3, the vehicle frame 12 includes the first rail 16 and the second rail 18. The first rail 16 and the second rail 18 are spaced from each other. As set forth above, the rails 16, 18 are elongated along the longitudinal axis L. The first rail 16 and the second rail 18 may be mirror images of each other or may be different from each other.

With continued reference to FIG. 3, the first rail 16 and the second rail 18 may each have a top surface 34. The vehicle body 14, e.g., the cross-beam 22, is above the top surfaces 34. The vehicle body 14 may be supported by the top surfaces 34, i.e., the weight of the batteries 26 may be directly or indirectly borne by the top surfaces 34. The vehicle body 14, e.g., the cross-beam 22, may be directly connected to the top surfaces 34, i.e., a common connection engages both the vehicle body 14 and the top surface 34. The vehicle body 14, e.g., the cross-beam 22, may abut, i.e., directly contact, the top surfaces 34.

The top surfaces 34 face upwardly. The top surfaces 34 may each be in a horizontal plane. The top surfaces 34 of the first rail 16 and the second rail 18 may be in a common horizontal plane, as shown in FIG. 3.

As set forth above, the vehicle frame 12 includes the longitudinal beam 20. As an example, the vehicle frame 12 may include more than one longitudinal beam 20, for example, the vehicle frame 12 shown in FIG. 3 includes two longitudinal beams 20. The longitudinal beams 20 are between the first rail 16 and the second rail 18. The longitudinal beam 20 may be elongated along the longitudinal axis L. The vehicle 10 may include more than one longitudinal beam 20. The longitudinal beams 20 may be elongated in parallel with the first rail 16 and the second rail 18.

The longitudinal beams 20 each include a top surface 36. The vehicle body 14, e.g., the cross-beam 22, is above the top surfaces 36. The vehicle body 14 may be supported by the top surfaces 36, i.e., the weight of the batteries 26 may be directly or indirectly borne by the top surfaces 36. The vehicle body 14, e.g., the cross-beam 22, may be directly connected to the top surfaces 36, i.e., a common connection engages both the vehicle body 14 and the top surface 36. The vehicle body 14, e.g., the cross-beam 22, may abut, i.e., directly contact, the top surfaces 36.

The top surfaces 36 face upwardly. The top surfaces 36 may each be in a horizontal plane. The top surfaces 36 of the longitudinal beams 20 may be in a common horizontal plane, as shown in FIG. 3. As an example, as shown in FIG. 3, the top surfaces 36 of the longitudinal beams 20 may be in the same horizontal plane as the top surfaces 36 of the cross-beam 22.

Figure 5:
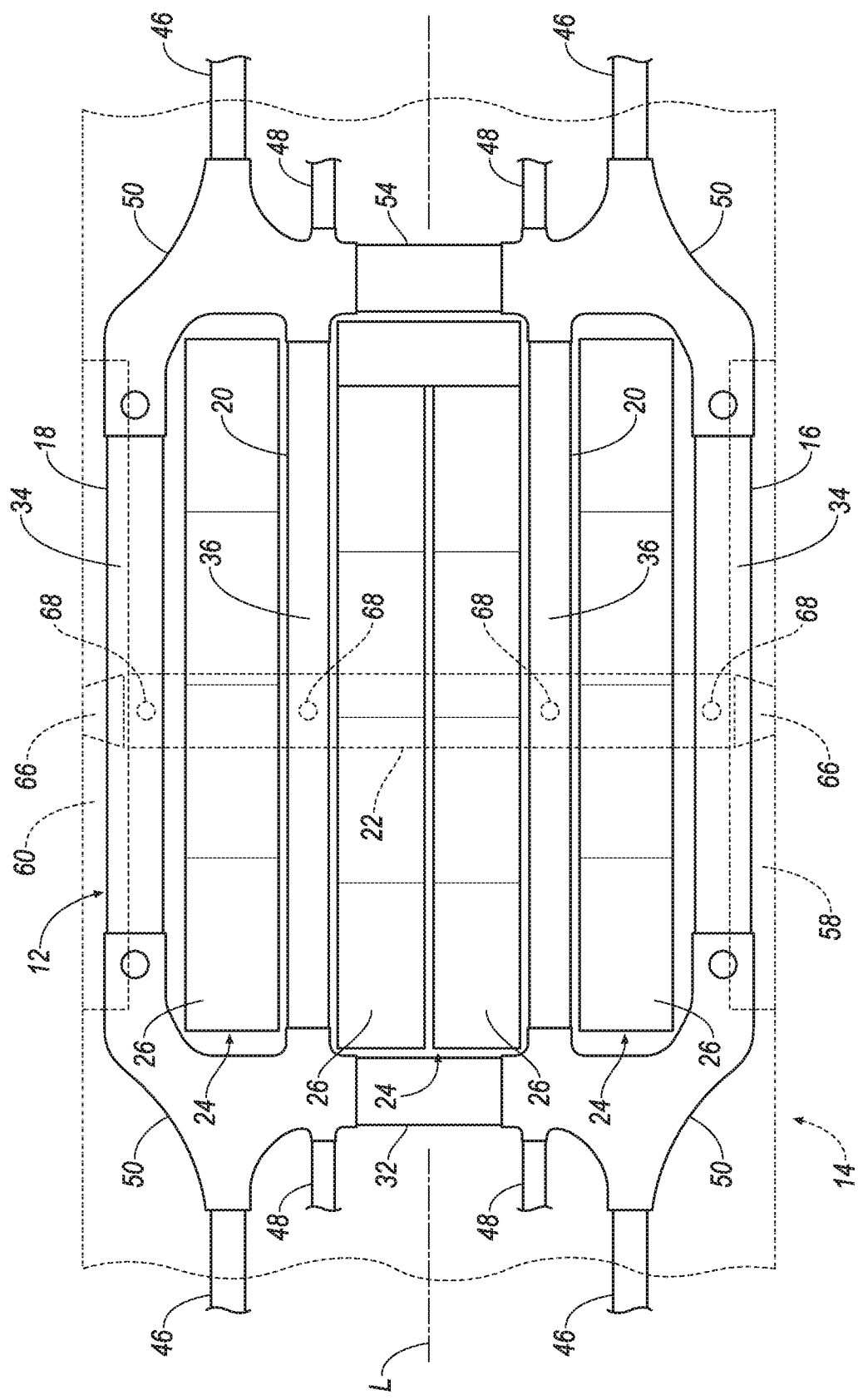
FIG. 5 is a top view of a portion of the vehicle frame with a portion of the vehicle body shown in broken lines.

With reference to FIGS. 3 and 5, the vehicle frame 12 includes at least one battery compartment 24, and the batteries 26 are disposed in the battery compartment 24. In the example, shown in FIG. 3, the vehicle frame 12 includes three battery compartments 24. The battery compartments 24 are defined between the first rail 16, the second rail 18, and the longitudinal beams 20. For example, in the example shown in FIG. 3, one battery compartment 24 is between the first rail 16 and one of the longitudinal beams 20, another battery compartment 24 is between the two longitudinal beams 20, and another battery compartment 24 is between the second rail 18 and one of the longitudinal beams 20. The cross-beam 22 extends over the battery compartments 24 above the battery compartments 24 to reinforce the battery compartments 24, e.g., during side impact. The battery compartments 24 may be free of cross-members, as described further below. This configuration reduces packaging constraints in the battery compartments 24 and allows for larger, uninterrupted areas in the battery compartments 24.

The batteries 26 are supported by the vehicle frame 12. Specifically, the batteries 26 are disposed in the battery compartments 24. The batteries 26 may be supported by the first and second rail 16, 18 and/or the longitudinal beams 20, i.e., the weight of the batteries 26 may be directly or indirectly borne by first rail 16, the second rail 18, and/or at least one of the longitudinal beams 20. As an example, the batteries 26 may be directly connected laterally to the first rail 16, the second rail 18, and/or at least one of the longitudinal beams 20. As another example, the batteries 26 may be directly connected to components above and/or below the batteries 26, e.g., a panel 38 as described below.

Figure 6:
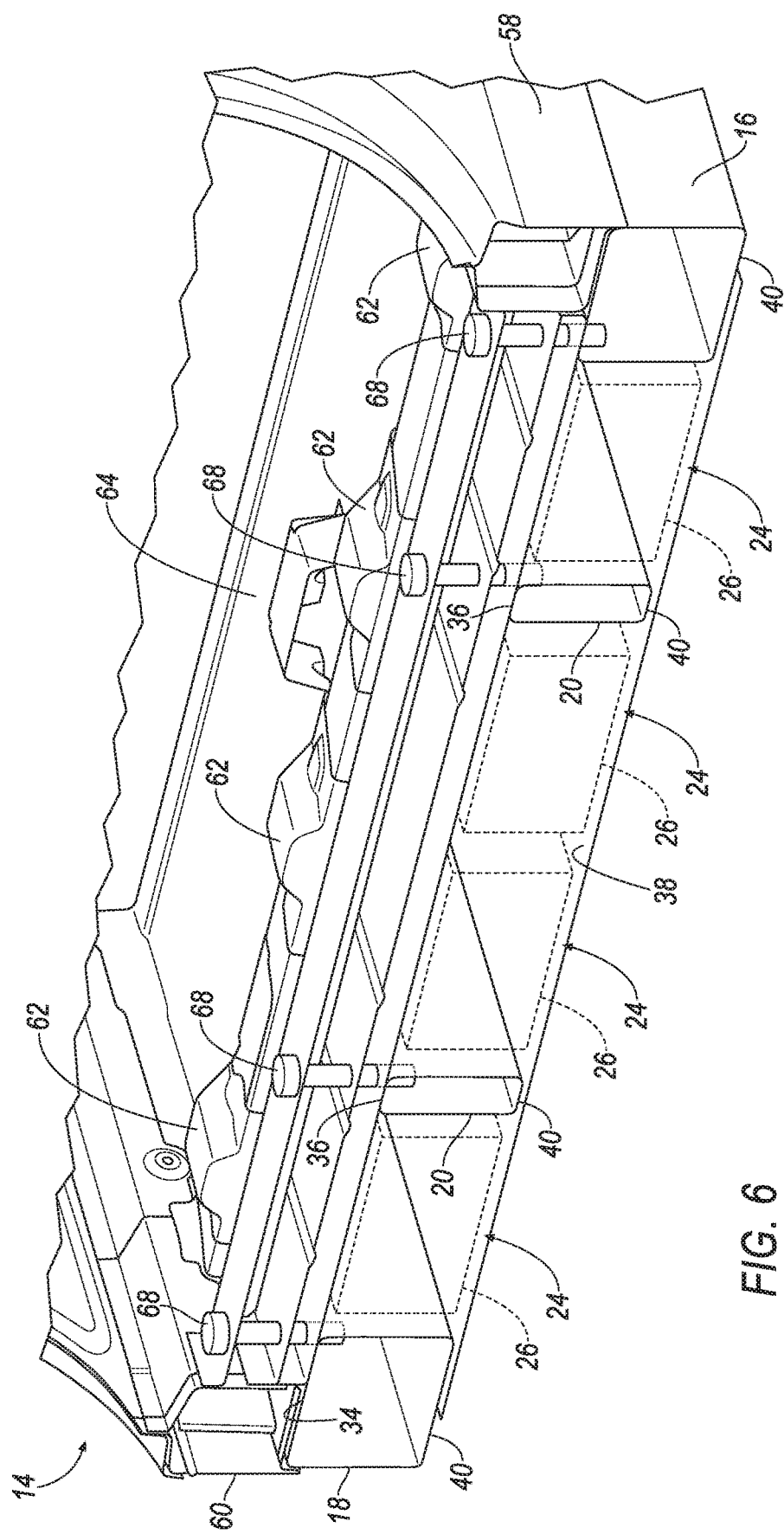
FIG. 6 is a cross-sectional view of a portion of the vehicle frame and the vehicle body with fasteners engaging the cross-beam and the first rail, second rail and longitudinal beams.
Figure 7:
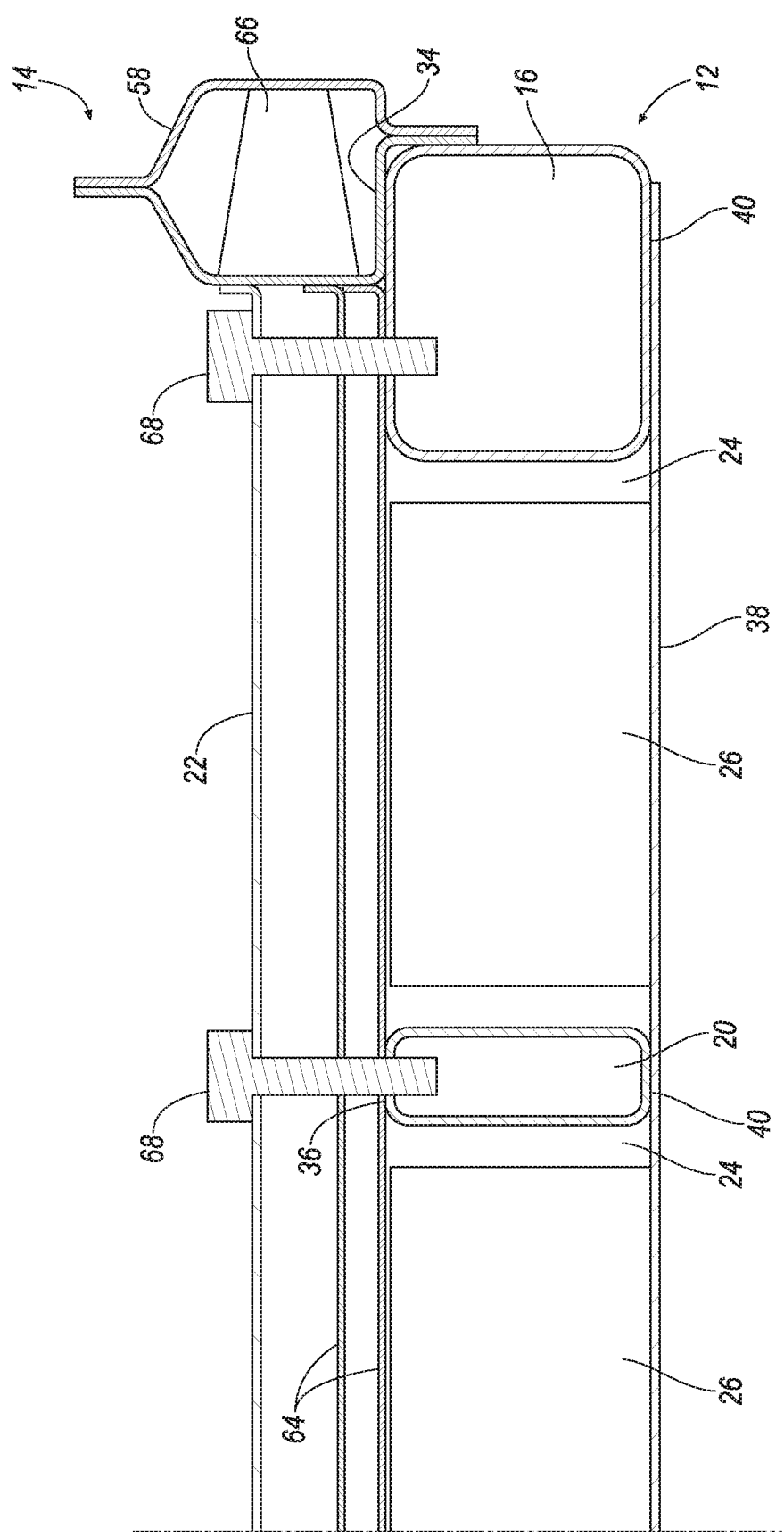
FIG. 7 is a cross-sectional view of a portion of the vehicle frame and the vehicle body showing the fasteners engaging the cross-beam and the first rail, second rail and longitudinal beams.

With reference to FIGS. 6 and 7, the vehicle frame 12 may include the panel 38. The first rail 16, the second rail 18, and the longitudinal beam 20s may be disposed between the panel 38 and the cross-beam 22. The panel 38 is beneath the first rail 16, the second rail 18, and the longitudinal beams 20. For example, the first rail 16, the second rail 18, and the longitudinal beams 20 have bottom surfaces 40 facing downwardly, and the panel 38 may abut the bottom surfaces 40. The panel 38 may be metal, plastic, or any suitable material. The battery compartments 24 are above the panel 38. The panel 38 may prevent intrusion of dirt, precipitation, etc., from the road surface into the battery compartment 24.

With reference to FIG. 3, the vehicle frame 12 may include a front end 42 and/or a rear end 44. The front end 42 and/or the rear end 44 may support vehicle components such as the motor 28, the suspension and steering equipment, etc. The first rail 16 and the second rail 18 are between the front end 42 and the rear end 44. The front end 42 and the rear end 44 may be mirror images of each other or may be different.

The front end 42 and/or the rear end 44 may include upper members 46 and/or lower members 48. In the Example shown in FIG. 3, the front end 42 and the rear end 44 each include a pair of upper members 46 and a pair of lower members 48. The upper members 46 and the lower members 48 transmit longitudinal impact forces to the first rail 16, the second rail 18, and the longitudinal beams 20.

The vehicle frame 12 may include a plurality of nodes 50. The nodes 50 connect the rails and the longitudinal beams 20 to each other. The nodes 50 may also connect the front end 42 and/or the rear end 44 to the rails and the longitudinal beams 20. The nodes 50 may be, for example, cast and formed of metal, e.g., steel, aluminum, etc.

The vehicle frame 12 may include a front cross-beam 52 and/or a rear cross-beam 54 connecting the first rail 16, the second rail 18, and the longitudinal beams 20 to each other. For example, the front cross-beam 52 and the rear cross-beam 54 connect to the nodes 50. The front cross-beam 52 may be forward of forward terminal ends of the first rail 16, second rail 18, and longitudinal beams 20. The rear cross-beam 54 may be rearward of rearward terminal ends of the first rail 16, the second rail 18, and the longitudinal beams 20.

The front cross-beam 52 and the rear cross-beam 54 are on opposite sides of the battery compartments 24. Since the cross-beam 22 reinforces the first rail 16, the second rail 18, and the longitudinal beams 20 in the cross-vehicle direction, the battery compartments 24 may be free of cross-members in the cross-vehicle 10 direction between the first rail 16, the second rail 18, and the longitudinal beams 20 from the front cross-beam 52 to the rear cross-beam 54. In other words, the space above the panel 38 and below the height of the cross-beam 22 may be free of cross-members in the cross-vehicle direction between the first rail 16, the second rail 18, and the longitudinal beams 20 from the front cross-beam 52 to the rear cross-beam 54.

The vehicle frame 12 may include a platform area 56 defined by the nodes 50, the first rail 16, the second rail 18, and the longitudinal beams 20. Specifically, the platform area 56 may be defined by the top surfaces 34 of the first rail 16, the second rail 18, and the longitudinal beams 20 and a portion of top surfaces of the nodes 50. The vehicle body 14 may be directly connected to the platform area 56.

The first rail 16, the second rail 18, and the longitudinal beams 20 may be recessed vertically relative to the front end 42 and the rear end 44. In other words, the rails 16, 18 may be lower relative to the front end 42 and the rear end 44. Specifically, the platform area 56 may be recessed vertically relative to the front end 42 and the rear end 44. The reinforcement of the vehicle frame 12 by the cross-beam 22 allows for the first rail 16, the second rail 18, and the longitudinal beams 20 to be recessed vertically, which allows for increased cabin space and increased size of the battery compartments 24.

The first rail 16 and the second rail 18 may extend outwardly relative to the front end 42 and the rear end 44 in cross-vehicle directions. In other words, the first rail 16 and the second rail 18 are outboard of the front end 42 and the rear end 44 in a cross-vehicle direction. Specifically, the platform area 56 may extend outwardly relative to the front end 42 and the rear end 44. The reinforcement of the vehicle frame 12 by the cross-beam 22 allows for the first rail 16, the second rail 18, and the longitudinal beams 20 to be outward relative to the front end 42 and the rear end 44, which increases the size of the battery compartments 24.

With reference to FIGS. 4-7, the vehicle body 14 includes a first rocker 58 and a second rocker 60 each elongated along the longitudinal axis L. The first rocker 58 and the second rocker 60 are spaced from each other in a cross-vehicle direction and may be at outboard ends of the vehicle body 14. The first rocker 58 and the second rocker 60 may each be one piece or may each be formed of multiple pieces fixed together, e.g., by welding and/or fasteners. The first rocker 58 and the second rocker 60 may be at a bottom of the vehicle body 14. Other components of the body 14, e.g., pillars, may extend upwardly from the first rocker 58 and the second rocker 60. During a side impact, the rockers absorb energy forces applied to the vehicle body 14.

The first rocker 58 may be supported by the first rail 16, and the second rocker 60 may be supported by the second rail 18. Specifically, the first rocker 58 may abut the first rail 16 and the second rocker 60 may abut the second rail 18. The first rocker 58 and the second rocker 60 may be directly connected to the first rail 16 and the second rail 18, respectively, e.g., by welds, threaded fasteners, etc.

As set forth above, the vehicle body 14 includes the cross-beam 22. The cross-beam 22 is elongated in a cross-vehicle direction. The vehicle body 14 may include more than one cross-beam 22. The cross-beam 22 is designed to transmit force from one of the first and second rails 16, 18 to the other of the first and second rails 16, 18. In other words, the cross-beam 22 transfers forces from the rail on the impacted side to the longitudinal beam 20 and the other rail.

The cross-beam 22 may be directly connected to the first rocker 58 and the second rocker 60, i.e., a common connection engages both the cross-beam 22 and the first rocker 58 and a common connection engages both the cross-beam 22 and the second rocker 60. For example, cross-beam 22 may be directly connected to the first rocker 58 and the second rocker 60 by welds, threaded fasteners, unitary construction, etc. As shown in the figures, the cross-beam 22 is welded to the first rocker 58 and the second rocker 60.

Figure 4:
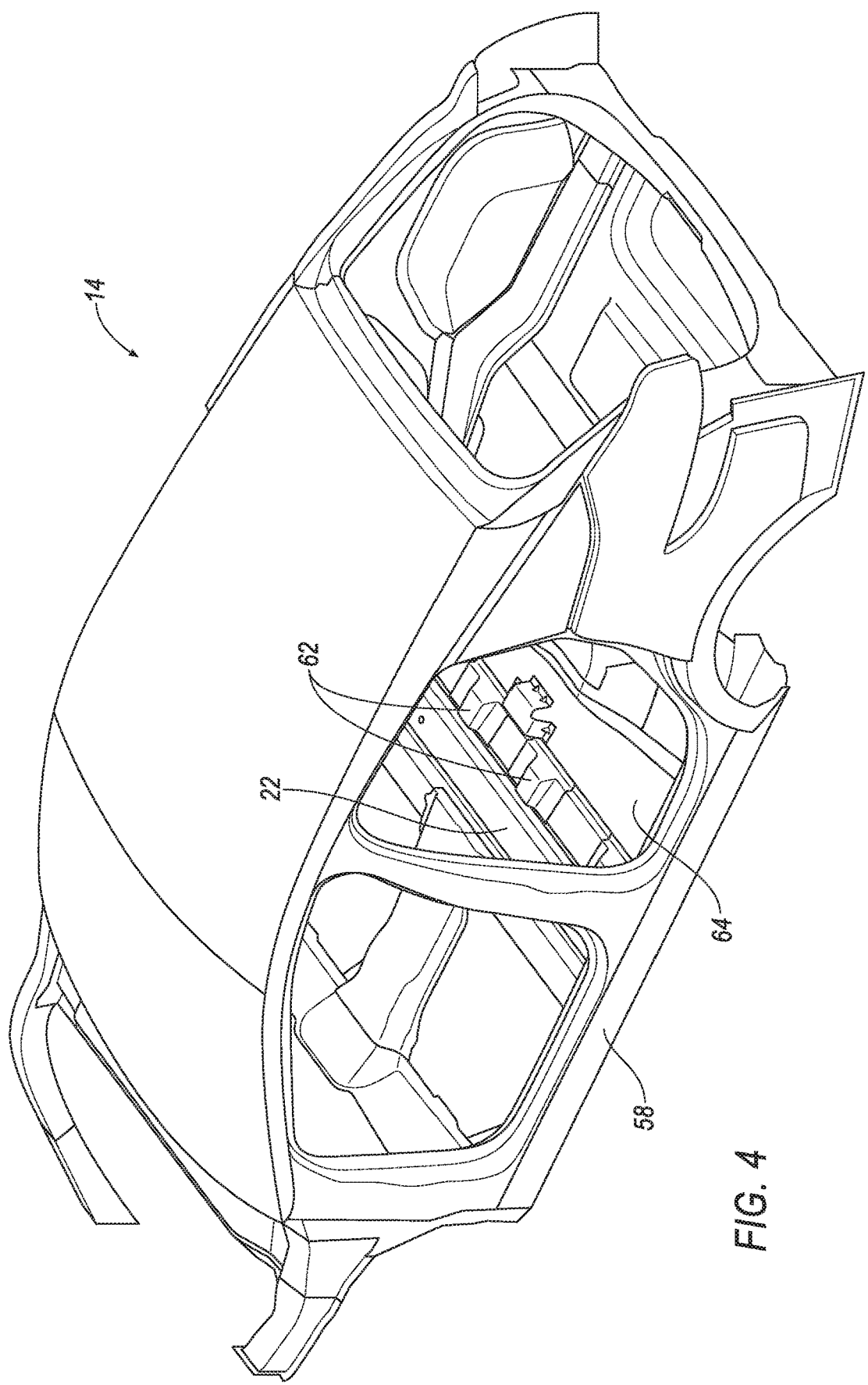
FIG. 4 is a perspective view of the vehicle body including a cross-beam and rockers.
Figure 8:
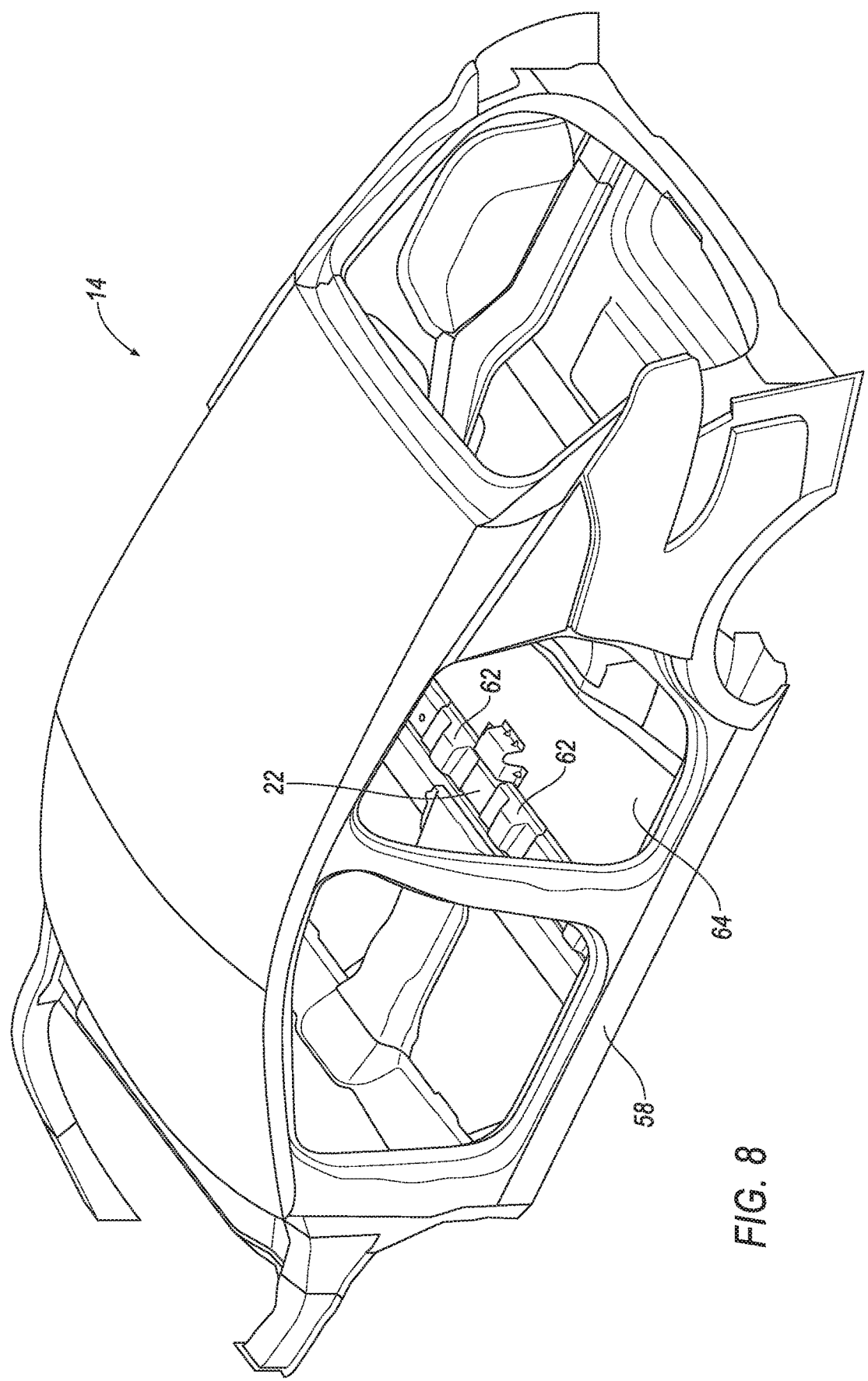
FIG. 8 is a perspective view of the vehicle body with seat mounts on the cross-beam.

The vehicle body 14 includes seat mounts 62. The seat mounts 62 are configured to be engaged with occupant seats to mount the seats to the vehicle body 14. The seat mounts 62 may separate from and fixed relative to the cross-beam 22, as shown in FIG. 4. As another example, as shown in FIG. 8, the seat mounts 62 may be on the cross-beam 22. In such an example, the seat mounts 62 are directly connected to the cross-beam 22, e.g., by welds, threaded fasteners, etc. The seat mounts 62 may be disposed on the top surface 36 of the cross-beam 22.

The vehicle body 14 is directly connected to the vehicle frame 12 e.g., by welds and/or threaded fasteners, etc. As set forth above, the cross-beam 22 is directly connected to the first rail 16, the second rail 18, and/or the longitudinal beams 20 of the vehicle frame 12. In other words, a common connection engages both the cross-beam 22 and the first rail 16, both the cross-beam 22 and the second rail 18, and/or both the cross-beam 22 and at least one of the longitudinal beams 20. As set forth above, the cross-beam 22, may be directly connected to the top surfaces 34, 36, i.e., a common connection engages both the vehicle body 14 and the top surface 34, 36.

The vehicle body 14, e.g., the cross-beam 22, may abut, i.e., directly contact, the top surfaces 34, 36. Alternatively, an intermediate component may be disposed between the cross-beam 22 and the top surfaces 34, e.g., a floor 64 as described below. In both examples, i.e., abutting or with an intermediate component, the common connection engages both the vehicle body 14 and the top surface 34. In the example, shown in FIGS. 6-7, fasteners 68 engage both the cross-beam 22 and the top surfaces 34, 36. The fastener 68 may be of any suitable type. As one example, as shown in FIGS. 6-7, the fastener 68 may be a threaded fastener, e.g., a bolt. In such an example, one or both of the cross-beam 22 and the first rail 16/second rail 18/longitudinal beam 20 may include a feature for threadedly engaging the threaded fastener, e.g., weld nuts. In addition to the direct connection between the cross-beam 22 and the first rail 16, the second rail 18, and/or the longitudinal beams 20, other components of the vehicle body 14 and the vehicle frame 12 may be directly connected to each other.

With reference to FIGS. 6-7, the vehicle body 14 may include the floor 64. The floor 64 may extend from the first rocker 58 to the second rocker 60. The floor 64 may be directly connected to the first rocker 58 and the second rocker 60, e.g., by welds and/or threaded fasteners, etc.

The floor 64 may be supported by the longitudinal beams 20 and/or the first rail 16 and second rail 18. The floor 64 may be above or below the cross-beam 22. In the example shown in FIGS. 6-7, the floor 64 is below the cross-beam 22, i.e., between the cross-beam 22 and the battery compartment 24. As shown in FIGS. 6 and 7, the fasteners 68 may extend through the floor 64. The vehicle floor 64 may be metal, plastic, or any suitable material.

The vehicle body 14 may include a reinforcement 66 disposed in the first rocker 58 and aligned with the cross-beam 22 along the longitudinal axis L. The reinforcement 66 is fixed relative to the first rocker 58/second rocker 60, e.g., may be directly connected by welds, threaded fasteners, unitary construction, etc. The reinforcement 66 may increase the structural rigidity of the first rocker 58/second rocker 60 to transmit impact forces through the rocker to the cross-beam 22.

During assembly, the vehicle frame 12 and the vehicle body 14 may be separately formed and subsequently married. The vehicle body 14 may be lowered onto the vehicle frame 12 to rest the first rocker 58 and the second rocker 60 on the first rail 16 and the second rail 18 with the cross-beam 22 extending cross-vehicle above the first rail 16, the second rail 18, and the longitudinal beams 20. The fasteners 68 are then engaged to directly connect the cross-beam 22 with the first rail 16, the second rail 18, and the longitudinal beams 20. In the example where the fasteners 68 are threaded fasteners, the threaded fasteners are rotated to threadedly engage the cross-beam 22 and/or the first rail 16, the second rail 18, and the longitudinal beams 20 to form the direction connection therebetween. In the assembly process, a common design for the vehicle frame 12 may be used with a variety of designs of the vehicle body 14. In other words, the vehicle body 14 may be one of any number of designs having the same connection points, e.g., for the fasteners 68, and any of these designs may be mounted to the vehicle frame 12. The relative locations of the cross-beam 22 and the rails 16, 18 may be constant across the various designs of the vehicle body 14, and the styling, size, layout, etc., of the rest of the vehicle body 14 be different across the various designs.

In use, as set forth above, the cross-beam 22 increases the cross-vehicle structural rigidity of the vehicle frame 12. For example, during a side impact, e.g., a side pole impact test, the cross-beam 22 transfers forces from the rail on the impacted side to the longitudinal beam 20 and the other rail. In the example where the direct connection between the cross-beam 22 and the first rail 16, the second rail 18, and the longitudinal beams 20 is by way of the fasteners 68, the fasteners 68 transmit forces between the cross-beam 22 and the first rail 16, the second rail 18, and the longitudinal beams 20. During a frontal vehicle impact, forces are transmitted rearwardly from the front end 42 and can be distributed across a combination of the rails 16, 18 and the longitudinal beams 20. The longitudinal beams 20 can absorb at least a portion of the impact energy of a frontal impact and thus reinforce the rails 16, 18.

The disclosure has been described in an illustrative manner, and it is to be understood that the terminology which has been used is intended to be in the nature of words of description rather than of limitation. The adjectives "first," "second," etc., are used throughout this document as identifiers and are not intended to signify importance or order. Many modifications and variations of the present disclosure are possible in light of the above teachings, and the disclosure may be practiced otherwise than as specifically described.

What is claimed is:

1. A vehicle comprising:
a vehicle frame elongated along a longitudinal axis, the vehicle frame including a first rail and a second rail spaced from each other and each elongated along the longitudinal axis, and the vehicle frame including a longitudinal beam between the first and second rails and elongated along the longitudinal axis; and
a vehicle body including a cross-beam directly connected to the longitudinal beam and to the first and second rails.

2. The vehicle as set forth in claim 1, further comprising a fastener engaging the cross-beam and the first rail, a fastener engaging the cross-beam and the second rail, and a fastener engaging the cross-beam and the longitudinal beam.

3. The vehicle as set forth in claim 2, wherein the first and second rails and the longitudinal beam each include a top surface, and wherein the fasteners extend through the top surfaces, respectively.

4. The vehicle as set forth in claim 2, wherein the vehicle body includes a first rocker and a second rocker each elongated along the longitudinal axis, and the cross-beam is welded to the first rocker and the second rocker.

5. The vehicle as set forth in claim 4, wherein the first and second rails each include a top surface, and wherein the first rocker and the second rocker are supported by the top surfaces.

6. The vehicle as set forth in claim 2, further comprising a floor, the fasteners extending through the floor.

7. The vehicle as set forth in claim 2, wherein the fasteners are threaded fasteners.

8. The vehicle as set forth in claim 1, wherein the vehicle body includes a first rocker and a second rocker each elongated along the longitudinal axis, and the cross-beam is directly connected to the first rocker and the second rocker.

9. The vehicle as set forth in claim 8, wherein the cross-beam is welded to the first rocker and the second rocker.

10. The vehicle as set forth in claim 8, further comprising a reinforcement disposed in the first rocker and aligned with the cross-beam along the longitudinal axis.

11. The vehicle as set forth in claim 1, wherein the first and second rails and the longitudinal beam each include a top surface, and the cross-beam is directly connected to the top surfaces of the first and second rails and the longitudinal beam.

12. The vehicle as set forth in claim 11, wherein the vehicle body includes a first rocker and a second rocker each elongated along the longitudinal axis and directly connected to the top surfaces of the first and second rails, and the cross-beam is directly connected to the first rocker and the second rocker.

13. The vehicle as set forth in claim 1, wherein the cross-beam is designed to transmit force from one of the first and second rails to the other of the first and second rails during a side impact.

14. The vehicle as set forth in claim 1, further comprising a floor supported by the longitudinal beams.

15. The vehicle as set forth in claim 1, further comprising batteries supported by the vehicle frame between the longitudinal beam and at least one of the first and second rail.

16. The vehicle as set forth in claim 1, wherein the cross-beam includes seat mounts.

17. The vehicle as set forth in claim 1, wherein the vehicle includes a front end and a rear end, the first and second rails being between the front end and the rear end and being recessed vertically relative to the front end and the rear end.

18. The vehicle as set forth in claim 1, wherein the vehicle includes a front end and a rear end, the first and second rails being between the front end and the rear end and extended outwardly relative to the front end and the rear end in cross-vehicle directions.

19. The vehicle as set forth in claim 1, further comprising a panel with the first rail, the second rail, and the longitudinal beam disposed between the panel and the cross-beam.

20. The vehicle as set forth in claim 19, further comprising batteries above the panel and below the cross-beam.

* * * * *